Feb. 28, 1961 K. W. SWAYZE 2,972,811
TRIGONOMETRIC AID
Filed March 25, 1958 2 Sheets-Sheet 1
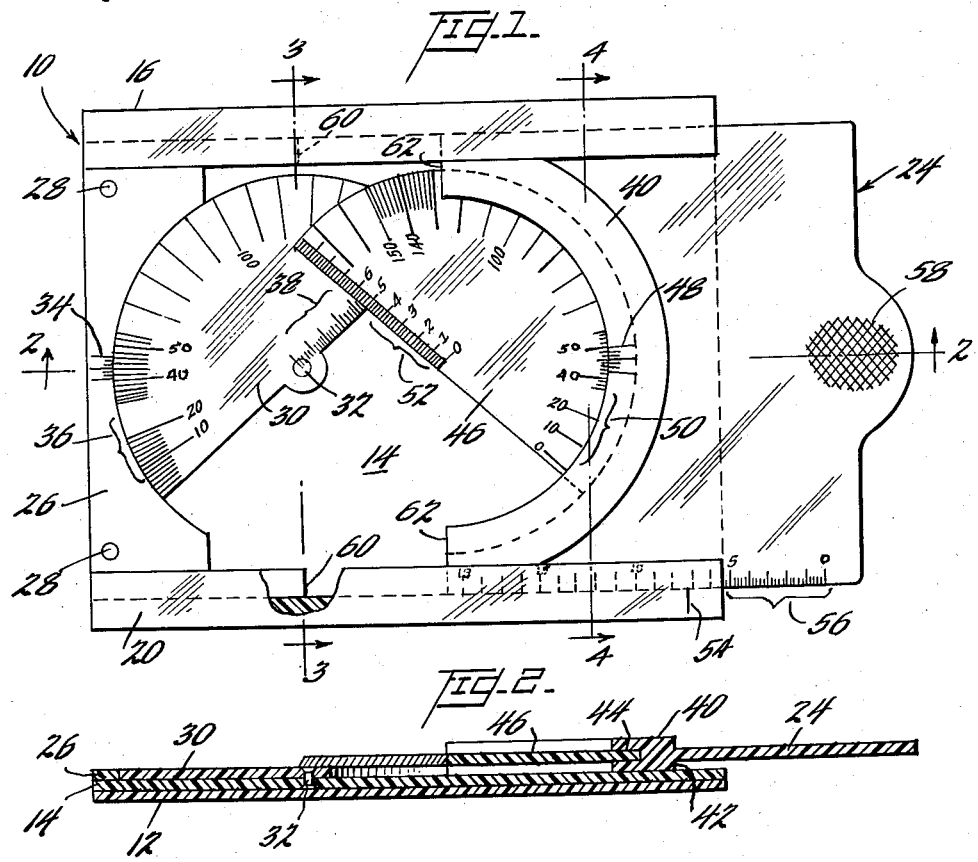
INVENTOR
Kenneth W. Swayze,
BY Parker and Walsh.
ATTORNEYS Feb. 28, 1961 K. W. SWAYZE 2,972,811
TRIGONOMETRIC AID
Filed March 25, 1958 2 Sheets-Sheet 2
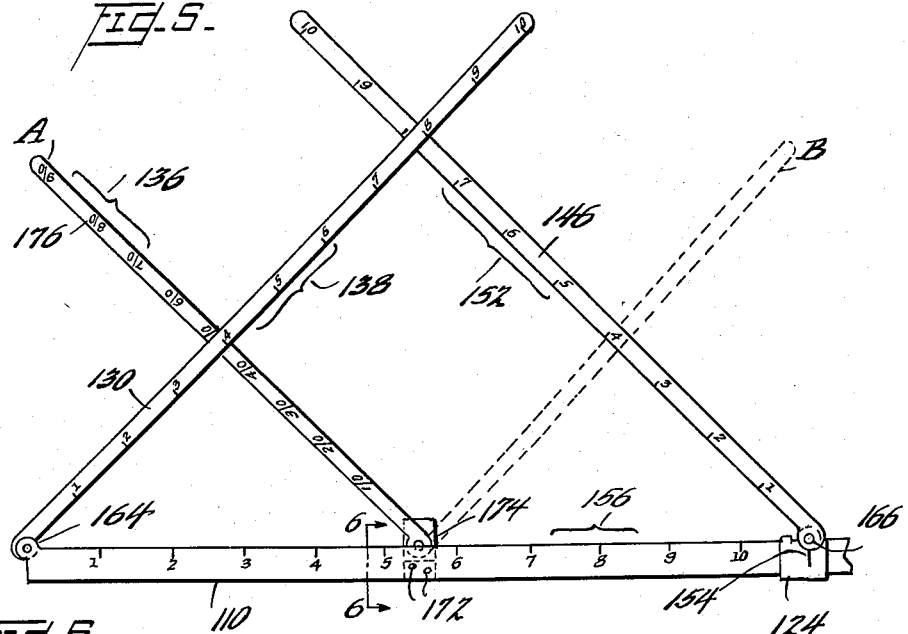
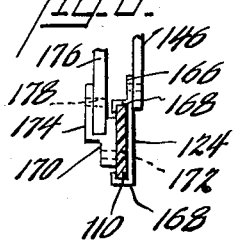
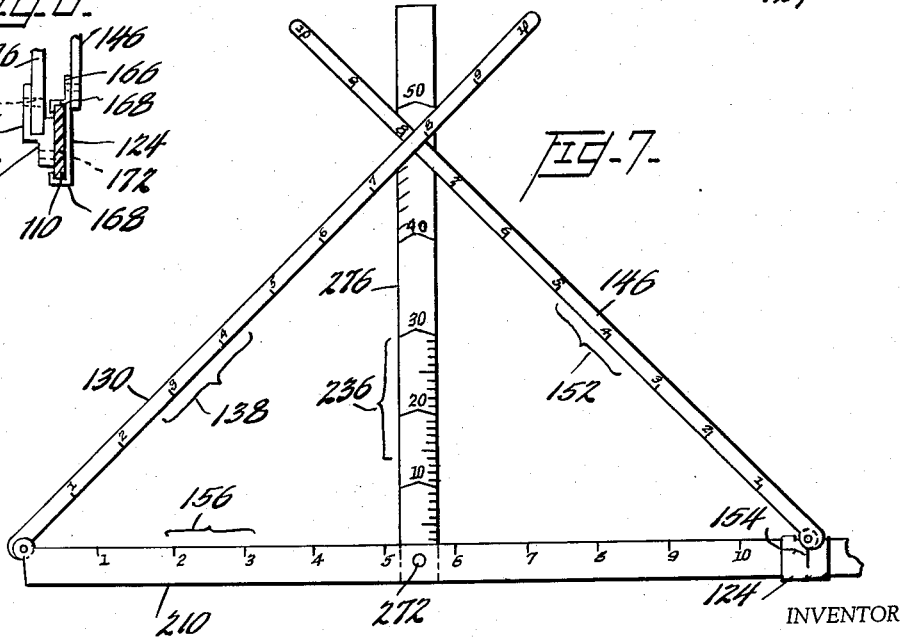
INVENTOR
Kenneth W. Swayze,
BY Parker and Walsh
ATTORNEYS

United States Patent Office 2,972,811
Patented Feb. 28, 1961

2,972,811

TRIGONOMETRIC AID

Kenneth W. Swayze, 568 5th St., Imperial Beach, Calif.

Filed Mar. 25, 1958, Ser. No. 723,695

1 Claim. (Cl. 33—1)

This invention relates to a device for the graphical solution of plane trigonometric problems.

The device may be thought of as a slide rule for the solution of trigonometric problems just as the more common slide rule is intended to solve factoring problems. Such an apparatus must necessarily have limitations as to accuracy in the same manner as a conventional slide rule. Obviously, hand or machine calculations of multiplication, division and similar problems, if carried out to a sufficient number of places, are more accurate than the conventional slide rule, yet the slide rule holds its place where an approximation of accuracy and rapidity of calculations are governing factors. Also, because the slide rule gives a visual demonstration of the computation, it has an appeal to the individual who is graphics-minded.

Similarly, my device when applied to the solution of plane trigonometric problems, although less accurate generally, has the advantage of rapid solutions. Further, since plane trigonometry deals with two dimensions, rather than the single, linear dimension needed to graphically present factoring problems, my device has relatively greater value as it is well known that the human mind finds it more difficult to grasp problems involving the additional dimension, thus requiring assistance, through graphic measures, to understand the mathematical operation.

In the embodiment disclosed in Figures 1 to 4 of the drawing,

Figure 1 is a plan view of the device with the solution to one type of problem being shown;

Figure 2 is a section along the lines 2—2 of Figure 1;

Figure 3 is a section along the lines 3—3 of Figure 1;

Figure 4 is a section along the lines 4—4 of Figure 1;

Figure 5 shows a plan view of another embodiment;

Figure 6 is an enlarged partial section along the lines 6—6 of Figure 5; and

Figure 7 shows a plan view of a third embodiment.

In the embodiment shown in Figures 1 to 4, there are four inter-related elements: a base 10, a first protractor 30 mounted on and movable with respect thereto; a slide 24 in slidable engagement with the base 10 and a second protractor 46 mounted on the slide 24 in a manner analogous to the mounting of the first protractor upon the base. Each of these elements, although necessarily having sufficient thickness to obtain rigidity, has no significant thickness with respect to its other two dimensions and all of the elements are arranged in closely spaced parallel planes. For ease in manipulation, I prefer to construct the base from opaque plastic material and the other three elements from transparent plastic sheet material.

Referring now to a more detailed enumeration of the features of this embodiment of the invention, the base 10 includes a bed plate 12 having mounted thereon a base plate 14. Secured to the bed plate at the top and bottom of the base plate 14 (as viewed in Figure 1) are top guide 16 having a groove 18 and a bottom guide 20 having a groove 22, the grooves 18 and 22 facing inwardly toward the base plate 14. These two grooves receive the slide 24 which is made to slide in and out of the grooves by grasping the tab 58 in the right hand. At the left hand end of the base there is an end plate 26 which may be held upon the base plate by means of screws 28 passing through to the bed plate 12. The end plate 26 extends inwardly from the left hand edge of the base 10 and extends between the top and bottom guides 16 and 20, which also extend out to the left edge.

The central portion of the end plate 26 is of arcuate shape to snugly house first protractor element 30 which is pivoted at its central point by means of rivet 32 to the base plate 14. An index 34 on the end plate 26 is arranged to be located on the horizontal axis of the instrument, indicated by the section line 2—2. The axis of each of the protractors 30 and 46 are similarly located. The protractor 30 may be swung about its axis rivet the full 180° indicated thereon at 36 but, for the solution to most problems, a somewhat lesser degree of feedom is all that is necessary. A linear scale 38 is laid out on the inner, straight edge of protractor 30.

Upon the inner end of slide 24, are mounted an upper arcuate guide 40 and a lower arcuate guide 42, forming a groove 44 in the same plane as the slide 24. The inward movement of slide 24 is limited by stops 60, located within grooves 18 and 22 terminating at the vertical axis of section line 3—3, and mating faces 62 located upon the slide 24.

The second protractor 46 moves in an arcuate path defined by the groove 44, about its central point opposite the rivet 32 of its companion first protractor 30. That is, the central point of the protractor 46 lies on the horizontal axis 2—2 and a vertical axis that would be drawn across the two faces 62 of the slide 24. If desired, the second protractor 46 may be held in the guide groove 44 by a suitable pin and slot connection, not shown.

An index, 48, corresponding with the horizontal axis 2—2, is located upon the upper guide 40. An angular scale 50 and a linear scale 52 are located upon second protractor 46 corresponding to the similar scales 36 and 38 on the first protractor 30.

A base index 54 is located upon the bottom guide 20 and a linear scale 56 is placed upon the slide 24 for cooperation with index 54. The relative relationship of index 54 and scale 56 is such that the scale will read zero when the slide 24 is moved completely to the left with the faces 62 against the stop 60. The lineal scales 38, on first protractor 30, 52, on second protractor 46 and 56, upon slide 24 will all read in the same units.

*Operation*

The apparatus shown in Figure 1 is arranged to solve the problem:

Given: Angle A—45°, Angle B—45°, Slide a—5.0
Find: Angle C, Side b, Side c

Manipulation is as follows:

(1) The first protractor is set with its index at 45°.
(2) The second protractor is set with its index at 45°.
(3) The slide is moved until the lineal scale on the second protractor intersects the lineal scale on the first protractor at the numeral 5 on the second protractor.

The solution of the problem is as follows:

(1) Angle C is determined by difference—(180°−(45° +45°))=90°
(2) Side b at intersection 5.0
(3) Side c opposite index 54 7.07

It will be noted that in any triangle system, the side opposite a given angle is read on the lineal scale of the protractor opposite the protractor upon which the angle is read.

Assuming that one angle and two sides were given, the solution would be found by setting the angle upon the first protractor and adjusting the slide and the second protractor to read with whichever two sides were given. The third side would then be read from the third scale, the second angle would then be read from the second protractor and the third angle determined by difference.

The apparatus is used to solve a problem given three sides of a triangle by setting the slide to indicate the longest side and the two protractors may then be adjusted, one with each hand until the appropriate figures for the other two sides, appear opposite each other on the lineal scales. Two of the angles are read at the respective indices and the third computed by difference.

In the modification shown in Figures 5 and 6, the base bar 110 corresponds to the base 10 and the slide 124 corresponds to the slide 24. The bar 130 carries the lineal scale 138 corresponding to the lineal scale 38 on the first protractor. The bar 146 carrying the lineal scale 152 serves the equivalent purpose of the second protractor 46 carrying the lineal scale 52.

The bar 130 is pivoted to the ear 164 upon base bar 110 while the second bar 146 is pivoted to the ear 166 on slide 124. The slide 124, preferably made of transparent material, is provided with upper and lower channel members 168, partially encircling the rear portion of base bar 110. This enables the slide 124 to be moved along base bar 110 while providing clearance for the rear portion of base bar 110. An index mark 154 on the slide 124 cooperates with the scale 156 in a manner corresponding to the index 54 and the scale 56 in the former embodiment.

A rear bracket 170 is riveted to the base bar at 172. Extending upwardly from the bracket 170 is the upright arm 174 upon which the protractor bar 176 is pivoted at 178.

*Operation*

To operate this embodiment of the invention, the angular position of the first bar 130 is fixed with the aid of the protractor bar 176. The underside of first bar 130 is made to coincide with the appropriate angle graduation 136 appearing on the face of protractor 176.

To locate the angular position of second bar 146, the slide 124 must first be placed at a predetermined index mark, which will be constant for the instrument, depending upon the point at which protractor bar 176 is pivoted to base bar 110. In the embodiment shown, this location is at the numeral 11 on the scale 156. The protractor bar is then swung from position A where it cooperates with first bar 130 to position B where it cooperates with second bar 146. The angular position of second bar 146 is then determined according to the problem. It will be readily apparent that there should be sufficient friction between first and second bars 130 and 146 and the respective ears 164 and 166 to cause the bar 130 or 146 to remain in whatever position it is placed.

By moving the slide 124 along the bar 110, any desired selection of triangle side lengths may be chosen, the length of one side being read on 156 against index 154 and the length of the other two sides being read on 138 and 152 at their point of intersection. It is believed that the further manipulation of this embodiment will be obvious from that pertaining to the first embodiment, together with the well-known geometric principles applying to triangles.

In the embodiment shown in Figure 7, the base bar 210 is essentially identical with the base bar 110 of the previous embodiment. However, the protractor scale 236 is carried upon a protractor bar 276 which may be fixed in upright position by means of rivet 272, or, if desired, the bar 276 may be held in a demountable position with respect to base bar 210 by means of a suitable fitting. The remaining elements of this embodiment are identical with those of the second embodiment. The angular position of bar 130 with respect to base bar 210 is determined by reference to the underside of bar 130 to the protractor graduations 236. As in the former embodiment, the slide 124 is brought to the predetermined graduation mark on scale 156 before moving second bar 146 into its desired angular position. Thereafter, the slide 124 may be moved along base bar 210 to whatever desired position is needed for the solution of a given problem.

It will be apparent that my invention is susceptible of embodiment in many other alternative forms, involving the use of elements corresponding to the members 10, 24, 30 and 46 together with their associated scales and indices.

My invention enables the simple, graphical solution of many trigonometric problems. The device is so simple that only a small amount of instruction is necessary to permit its use by persons having occasion to use a device of this character, even though such persons have had no training in geometry or trigonometry.

I claim:

A device for the solution of plane trigonometric problems comprising: a planar base member; a first flat, movable protractor member, having at least one lineal scale in the plane along the diameter thereof pivoted to said base for movement in a closely adjacent, parallel plane with respect to said base; a complemental angular scale and index, the latter carried by said base and the former by said first protractor member for indicating the angular relationship of said first protractor member to said base, about the pivot point; a flat slide member mounted for linear movement in a closely adjacent, parallel plane of said base; a complemental linear scale and index, one each carried by said base and said slide member for indicating the position of the slide member with respect to the base in its direction of movement; a second, flat movable protractor member having at least one lineal scale in the plane along the diameter thereof, pivoted to said slide for movement in a closely adjacent, parallel plane with respect to said slide and said base; and a second complemental angular scale and index, the latter carried by said base and the former by said second protractor member for indicating the angular relationship of said second protractor member to said base about the pivot point; said slide being movable on said base to bring the lineal scales of said first and second protractor members into intersecting relationship whereby each scale serves to index the other.

References Cited in the file of this patent

UNITED STATES PATENTS 791,848    Wilson _____ June 6, 1905